INVENTOR.
JOHN H. FREEMAN JR.
BY
ATTORNEY.

INVENTOR.
JOHN H. FREEMAN JR.

BY Edward H Lang
ATTORNEY.

Aug. 16, 1966 — J. H. FREEMAN, JR — 3,267,185
METHOD AND APPARATUS FOR FORMING AND
FILLING HOLLOW PLASTIC ARTICLES
Filed Dec. 31, 1962 — 4 Sheets-Sheet 3
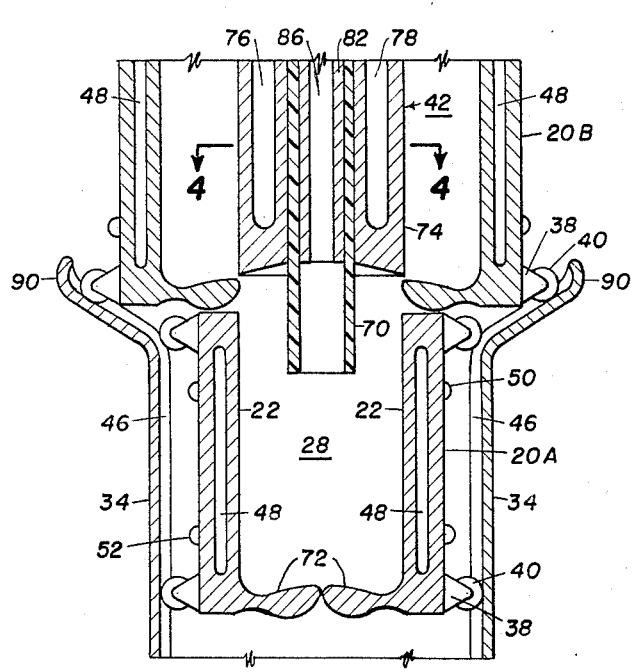
FIG. 3
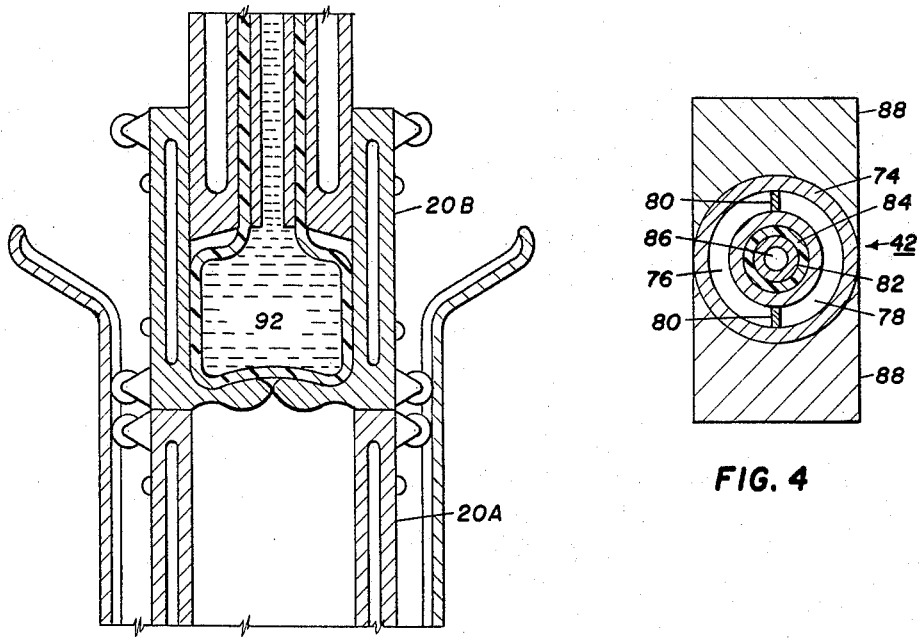
FIG. 5
FIG. 4
INVENTOR.
JOHN H. FREEMAN JR.
BY
Edward H. Lang
ATTORNEY.

Aug. 16, 1966  J. H. FREEMAN, JR  3,267,185
METHOD AND APPARATUS FOR FORMING AND
FILLING HOLLOW PLASTIC ARTICLES
Filed Dec. 31, 1962   4 Sheets-Sheet 4

INVENTOR.
JOHN H. FREEMAN JR.
BY
Edward H. Lang
ATTORNEY.

United States Patent Office 3,267,185
Patented August 16, 1966

3,267,185
METHOD AND APPARATUS FOR FORMING AND FILLING HOLLOW PLASTIC ARTICLES
John H. Freeman, Jr., Crystal Lake, Ill., assignor, by mesne assignments, to Union Oil Company of California, Los Angeles, Calif., a corporation of California
Filed Dec. 31, 1962, Ser. No. 248,310
11 Claims. (Cl. 264—99)

This invention relates to molding hollow articles from plastic materials and, more particularly, to a continuous method in which a plastic container is blow molded, filled with a product, and sealed at high speeds.

One conventional method by which hollow plastic articles, such as bottles, are blow molded is by extruding a tube of heat-softened plastic material from an annular extrusion nozzle between two halves of a sectional mold cored to the shape and dimensions of the required bottle. After the tubular plastic material is extruded, the mold halves are closed around the tube to pinch the end of the tube, thereby closing and sealing it. The heat-softened tube, which is still connected to the plastic in the extrusion nozzle, is then expanded against the cored surface of the mold cavity by air introduced into the interior of the tube through a center opening in the extrusion orifice. The bottle thus formed is then severed from the extrusion head and removed from the mold cavity after it has sufficiently cooled.

In a second conventional process, the tubular plastic material is extruded continuously from an extrusion nozzle and molds are positioned around the tubing and closed while moving continuously away from the nozzle. The closed molds are replaced by a following set of open molds. The tubing, which is pinched closed at both ends by the closing of the molds, is inflated through a "needle" that punctures the tube at a point that is later trimmed off.

Both of the above-described conventional methods of blow-molding bottles suffer from various drawbacks. These conventional methods require the costly and wasteful secondary operations to remove trim from the bottle neck and bottom portions of the tube. Still another separate operation is required for filling the containers. Since the filling operation quite frequently takes place at a plant location different from that where the bottles are made, it is often necessary to store and/or transport the empty containers. In addition, conventional plastic bottles require removably mounted closures, whereas the ultimate use of the containers may not require a separate closure. For example, a separate closure is not required when the entire contents of the container are to be dispensed at one time, as in the case of one-quart containers of lubricating oils sold by gasoline filling stations. In many instances, the need for separate closures for containers can be satisfactorily, if not advantageously, eliminated by forming the container with an integral, self-sealing pour spout.

Containers with integral, self-sealing pour spouts are especially well suited to the packaging of liquids, such as lubricating oils, but will also find use in the packaging of many other types of materials. A wall of such a container is provided with a pre-marked area which can be slit, as with a knife, to open the container. The container is so shaped that the application of pressure to the container walls will spread the edges of the slit apart to form an opening through which the contents can be dispensed, while removal of the applied pressure permits the edges of the slit to come back together and seal the container.

In copending patent application Serial No. 226,922, filed September 28, 1962, of Kevin E. Moran, there is described a blow molding apparatus and method, which overcome many of the disadvantages inherent in conventional blow molding operations. In the method of said copending patent application, a tube of heat-softened plastic is continuously extruded downwardly from a stationary extrusion nozzle while a circular mold carrier is rotated about a horizontal axis, such that a plurality of sectional molds, mounted in adjacent and end-to-end relationship on the periphery of the carrier, are rotated at the extrusion speed in the same direction that the plastic is extruded. The halves of each of the sectional molds are in succession opened and positioned around the plastic tube to receive a length thereof and are then closed, while the next sectional mold is preparing to receive the next length of the tubular plastic. The sectional molds are so constructed that the closing thereof effects the closing and sealing of the end of the enclosed length of tube which is remote from the extrusion nozzle, i.e., the lower end, while the upper end of the tube is still connected to the extrusion nozzle. The closing of the sectional molds also effects the closing and sealing of the upper end of the tube in the cavity of the preceding mold. Thereupon the enclosed segment of tubular plastic is expanded into molding contact with the sectional mold by the introduction of air into the interior thereof through an opening in the extruder. The open-ended container thus formed is filled with the material to be contained therein by a central fill pipe in the extruder while air is vented from the formed container at a rate sufficient to maintain pressure in the container. Finally, the next sectional mold, having completely received the next length of the tubular plastic, closes to sever the formed and filled container from the tube being extruded, while concurrently closing and sealing the lower end of the tube being extruded.

The invention of said copending patent application overcomes many of the disadvantages which are inherent in conventional blow molding operations, such as the elimination of the wasteful and costly secondary trimming operations, the need for storage and/or transportation of empty containers, and the separate handling of the containers for filling purposes. Other advantages are that the operation is a continuous and high-speed operation, the need for separate closures is eliminated, and the containers are maintained in a sterilized condition. While the hereinbefore described method of said application overcomes many disadvantages of prior art blow molding techniques, the process and required apparatus are excessively complex. The acts of forming and filling the containers, though performed automatically in the same mold, are still separate operations. The introduction and venting of air within the thermoplastic extrusion creates problems of pressure control, valving, and phasing. The application of vacuum to the mold surfaces is awkward, troublesome, and many times insufficient to produce containers of uniform quality. In addition, since the extruded parison is not entirely enclosed within the mold cavities during the forming and filling operations (the molds have an open top), extreme care must be taken in regulating the internally applied air pressure and product pressure so that the parison does not expand beyond the open top of the mold cavity and/or burst during either of the forming or filling operations.

My invention is based on a novel blow molding method which overcomes the above-mentioned disadvantages of the method of said copending application, but retains the advantages thereof over conventional blow molding operations. The subject invention obviates the difficulties and encumberances by eliminating the introduction and subsequent venting of air within the extrusion, and by eliminating the application of vacuum on the interior mold surfaces. In accordance with this invention, the liquid to be packaged, under controlled positive pressure and regulated temperature, is used to form the container. The simplified features of this invention enable it to be faster in operation than the invention of said copending application. The novel features of this invention reside in the design, operation, and function of the extrusion head, the sectional molds and their ancillaries.

In the blow molding of plastic containers in accordance with this invention, a tube of heat-softened plastic material is continuously extruded from an extruder nozzle while the extruder nozzle and a series of sectional molds, adapted to be opened and closed and aligned in adjacent end-to-end relationship, are moved with respect to each other at a speed equal to the extrusion speed. Preferably, a stationary extruder continuously extrudes the tubular plastic in a downward direction, while a circular mold carrier, mounted for rotation about a horizontal axis and having the sectional molds mounted on a periphery thereof, is continuously rotated at a speed such that the tangential velocity of the molds equals the velocity of thermoplastic extrusion. At least a portion of the outer surface of the extruder is of substantially uniform cross-section and conforms to the shape of the side walls of the mold cavities. The cavities of all of the molds are of the same shape and are formed by the closed sectional molds with only bottom and side walls and an open top. The extruder is slightly smaller than the mold cavities so that it is freely slidable therein.

The halves of each of the sectional molds are in succession opened, positioned around the extrusion nozzle and a small segment of parison being extruded therefrom, and are then closed, while the next sectional mold is preparing to receive the extrusion nozzle and parison being extruded therefrom. In the closing of the sectional molds, at least a portion of the extruder nozzle is received within a major portion of the mold cavities to form a small space between the lowermost portion of the extruder and the bottom wall of the cavity, where the unconfined parison is received. The closing of the sectional molds effects the closing and sealing of the lower end of the received length of the plastic tube and the open upper end of the formed and filled article in the preceding sectional mold. The closing of the plastic tube also severs it from the formed article in the preceding sectional mold.

Thereupon the fluent material to be packaged in the finished container is introduced through a central opening in the extruder into the interior of the tubular plastic material being extruded to expand the plastic tube into molding contact with the sectional mold, at a rate such that the tubular plastic material is expanded at substantially the same rate the volume defined between the extruder and the bottom wall of the mold cavity is increased by the movement of the sectional mold. The introduction of the fluent material is then terminated before the tubular plastic material is expanded beyond the top of the sectional mold. Finally, the next sectional mold, having been positioned around at least a portion of the extruder and parison, closes to sever the formed and filled container from the tube being extruded, while concurrently sealing the open top of the formed and filled container. The cycle is then repeated for forming the next container and the completed and filled containers are ejected from the sectional molds at some later point in the revolution of the mold carrier.

Accordingly, the primary object of this invention is to provide a novel blow molding apparatus and method which eliminate the disadvantages inherent in conventional blow molding processes;

Another object of this invention is to provide a novel apparatus and method for forming and filling hollow plastic articles;

Still another object of this invention is to provide a novel blow molding apparatus and method in which plastic containers are simultaneously formed and filled with a product to be contained therein, and then sealed in one continuous operation.

These and further objects of this invention will become apparent or be described as the description herein proceeds and reference is made to the accompanying drawings in which.

Figure 2:
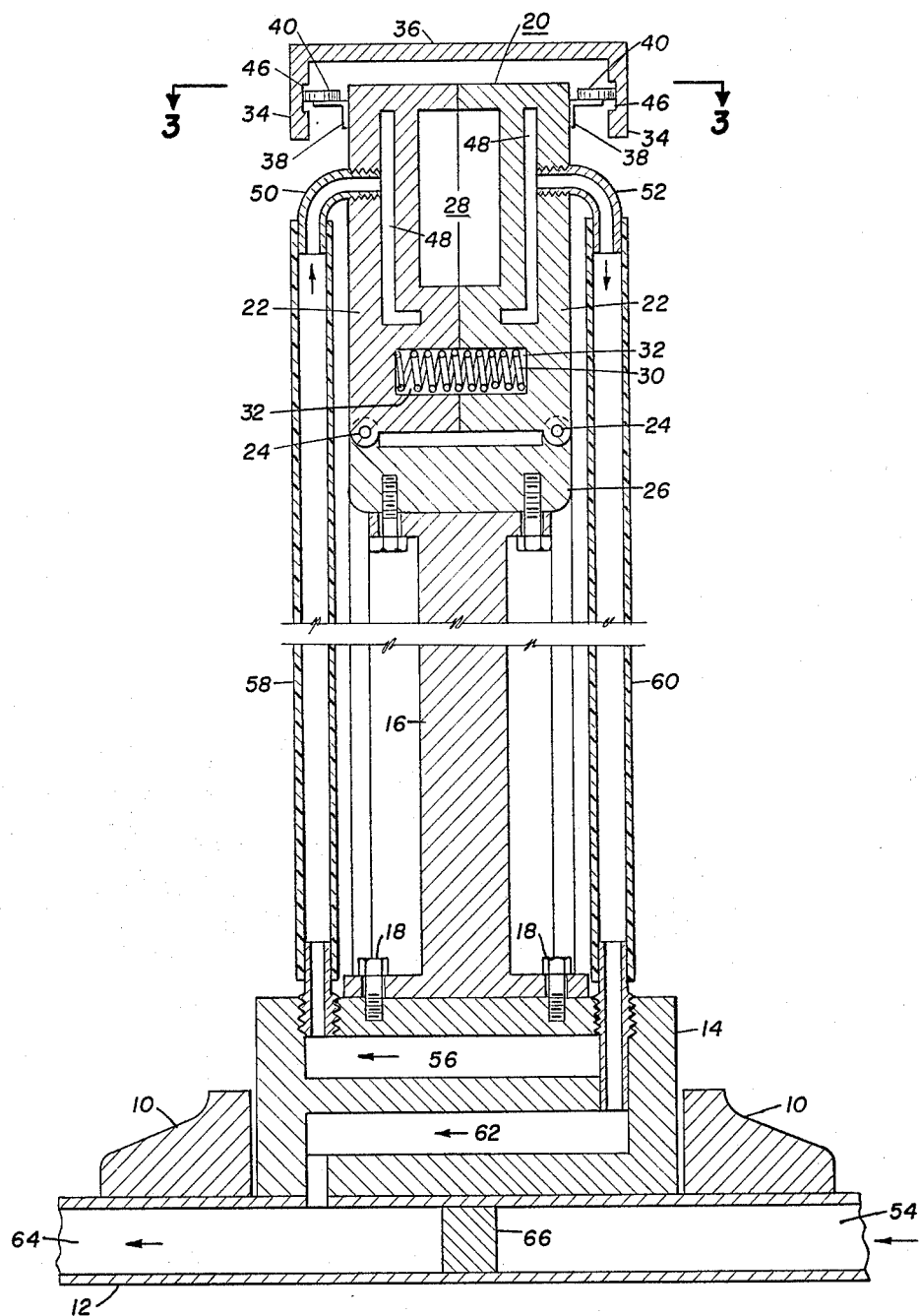
FIGURE 2 is a section on an enlarged scale on line 2—2 of FIGURE 1.
Figure 6:
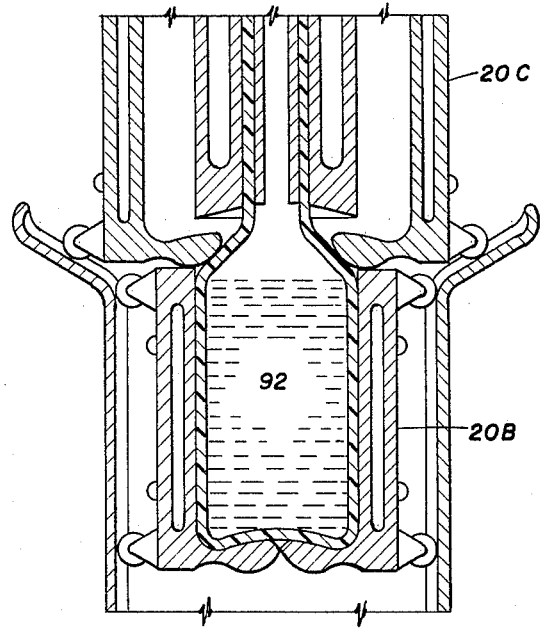

FIGURES 3 and 5–7 are cross-sectional views, through line 3—3 of FIGURE 2, depicting the steps in the performance of the novel method; and FIGURE 4 is a cross-sectional view of the extruding device shown in FIGURE 3 and taken along the line 4—4.

Figure 1:
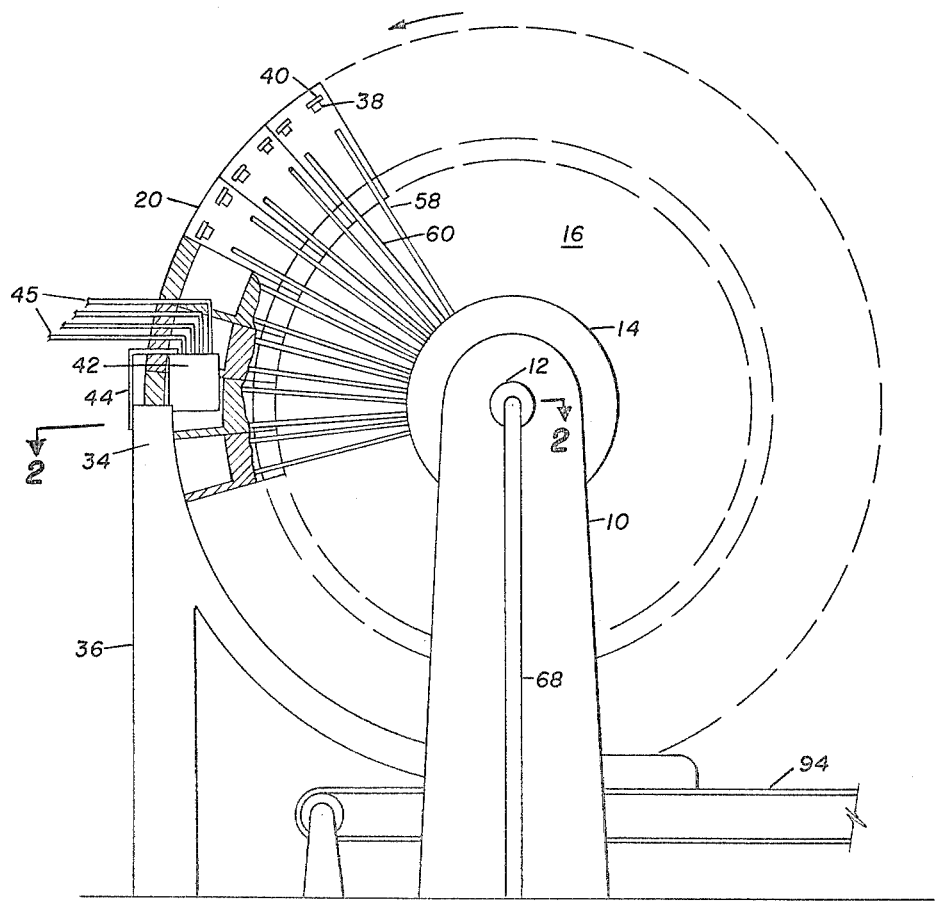
FIGURE 1 is an elevation of an apparatus suitable for carrying out this invention.

Referring to FIGURES 1 and 2, the numeral 10 denotes the support member of the molding apparatus, in which hollow shaft 12 is rotatably mounted. Shaft 12 receives motion to rotate in the direction indicated by the arrow in FIGURE 1 by means not shown for the sake of simplicity. Shaft 12 has keyed thereon hub 14 to which circular mold carrier 16 is secured by bolts 18. Mounted around the periphery of annular mold carrier 16 in adjacent end-to-end relationship are a plurality of sectional molds 20, each of which includes a pair of mating mold halves 22. Mold halves 22 are pivotally attached to carrier 16 by pins 24 secured to floating mounting means 26 of carrier 16 in order that molds 20 can be opened and closed, as well as guided in a motion of pure translation for the entire time they are presented to the extruding device to be hereinafter described. The details of floating mounting means 26 are omitted for the sake of simplicity and clarity since such means are a common feature of automatic machine tools and the details thereof, such as spring arrangements, would be apparent to one skilled in the art. When closed, mold halves 22 define mold cavity 28 which conforms to the shape of the article to be blow molded.

Suitable means are provided for opening and closing the pivoted mold halves 22 at predetermined intervals of time during the operation of the machine. In the embodiment of the invention herein illustrated, the actuating means for opening mold halves 22 comprises spring 30 disposed in adjoining cavities 32 of each pair of mold halves 22 to bias same in an open position. The biasing of mold halves 22 open by spring 30 is counteracted and mold halves 22 are held in a closed position when the ends thereof are passed between inwardly extending lips 34 of guide member 36. Secured to the ends of mold halves 22 are L-shaped brackets 38 on which are rotatably mounted rollers 40 to engage the inner surfaces of lips 34.

The plastic is extruded from extruding device 42, which is held stationary as by bracket 44 secured to guide 36. Conduits 45 supply plastic, the product and heating medium to device 42. Molds 20, which are pivotally attached to floating mounting means 26 of carrier 16, are guided in a motion of pure translation for the entire time they are presented to extruding device 42 by rollers 40 engaging grooves 46 on the inner surfaces of lips 34. The size of grooves 46 is exaggerated for the purpose of clarity. This feature is used to prevent binding of mold halves 22 on extruding device 42, a condition which would otherwise exist because of the finite radius of curvature of mold carrier 16.

Mold halves 22 are cooled by circulating a cooling medium, such as water, through cooling chambers 48, each of which is provided with a cool water inlet 50 and a warm water outlet 52. Cool water is introduced into cooling chambers 48 through longitudinal opening 54 in hollow shaft 12, from where it flows through a conduit, not shown, into annular chamber 56, through flexible conduit 58, and into inlet 50. The cooling medium, which is warmed by plastic in cavity 28, leaves cooling chamber 48 through outlet 52, and flows through flexible conduit 60. The fluid in conduit 60 enters annular chamber 62 in hub 14, from where it flows through longitudinal opening 64 in hollow shaft 12. Longitudinal openings 54 and 64 are separated by plug 66. The warmed cooling fluid in longitudinal opening 64 is withdrawn through conduit 68 and is cooled by a suitable means, as being passed through a cooling tower, before it is recirculated through opening 54. The means for withdrawing the warmed fluid from opening 64 and introducing a cool liquid into opening 54 while hollow shaft 12 is rotating are not shown for the sake of simplicity.

Referring to FIGURES 3 and 4, extruding device 42 is illustrated extruding parison 70 in unconfined tubular form. Mold halves 22 are held in an open position by spring 30 (FIGURE 2) so that lateral edges 72 forming the bottom wall of mold cavity 28 pass around extruding device 42. Lateral edges 72 are beveled to define a pair of pinching jaws or edges for severing plastic tube 70 therebetween and concomitantly sealing the severed ends as hereinafter described.

Extruding device 42 includes cylindrical tube 74, which contains semi-cylindrical chambers 76 and 78 through which a heating medium, such as oil or steam, is circulated to keep the plastic in device 42 in a heat-softened condition. Heating chambers 76 and 78 are separated from each other by longitudinal spacers 80, which extend from the uppermost portions of heating chambers 76 and 78 to a short distance from the bottoms thereof where openings, not illustrated, connecting heating chambers 76 and 78 are provided. The heating medium introduced through an inlet pipe flows downward in heating chamber 76, enters heating chamber 78 through the openings provided in spacers 80, flows up in heating chamber 78, and then out an outlet pipe. Mounted within cylindrical tube 74 is inner cylindrical tube 82, the outer diameter of which is less than the inner diameter of cylindrical tube 74 to form therebetween annular plastic passageway 84. Longitudinal opening 86 in inner cylindrical tube 82 is used for introducing the fluent material, such as lubricating oil, which is to be contained within the finished containers into parison 70.

As hereinbefore pointed out, a feature of this invention is that at least a portion of extruding device 42, which conforms to the shape of the side walls of cavities 28, be received in cavities 28. Since cavities 28 are illustrated as being rectangular in cross-section (FIGURE 2) and tube 74 is cylindrical, blocks 88 are secured by suitable means on opposite sides of tube 74 so that the requisite portion of extruding device assembly 42 is of the proper shape. Extruding assembly 42 (including blocks 88) is of such a size that a small clearance space is provided between device 42 and the side walls of cavity 28 so that pressure created by the expansion of parison 70 may be vented therebetween. It will be evident that bracket 44 and conduits 45, illustrated in FIGURE 1, must be located with respect to device 42 so as not to interfer with the portion thereof received in cavities 28.

The steps in forming and filling a plastic container will now be described by reference to the accompanying drawings. Assuming machine shaft 12 to rotate in the direction of the arrow shown in the FIGURE 1, sectional molds 20 are moving in the same direction and at the same speed as parison 70 (FIGURES 3 and 5–7) which is being extruded from extruding device 42, while extruding device 42 is held stationary. Referring to FIGURE 3, which shows the apparatus in a startup position, sectional mold 20A is illustrated as having received the initial length of the parison 70 extruded from device 42, while sectional mold 20B is about to receive the next length of parison 70. In order to simplify the illustration of the apparatus, certain details such as the means for feeding the plastic material, the fluent product which is used for expanding the plastic, and temperature control fluid to extruding device 42 have been omitted, but it will be understood that suitable known means may readily be provided for such supply by one skilled in the art.

Sectional mold 20B is gradually closed after lateral edges 72 thereof passed the lowermost portion of device 42 by lowermost rollers 40 of mold 20B engaging flared ends 90 of mold ramp 34. Flared ends 90 are so shaped and located in a position relative to extruding device 42 that the downward movement of each of sectional molds 20 will cause halves 22 thereof to completely close after lateral edges 72 have passed extruding device 42 to permit lateral edges 72 to pass under extruding device 42. The gradual closing of halves 22 moves lateral edges 72 toward each other until they close to sever parison 70 therebetween. Lateral edges 72 are so shaped that severing of parison 70 therebetween also effects the sealing of the open ends of parison 70 in adjacent mold cavities 28.

After halves 22 of sectional mold 20B have closed, to receive in a major portion of cavity 28 thereof at least a portion of extruding device 42 and a length of parison 70 in the small space formed between the lowermost portion of device 42 and lateral edges 72, the introduction of the fluent material to be contained in the finished containers, such as a lubricating oil, is intiated to expand the received length of plastic tube 70 to substantially conform to the shape of cavity 28. The blowing of parison 70 received in cavity 28 of mold 20 is illustrated in FIGURE 5. Liquid 92 is introduced under pressure into plastic tube 70 at a rate such that plastic tube 70 is expanded at substantially the same rate that the space between extruding device 42 and lateral edges 72 is increased due to the continuous movement of sectional molds 20. The lower end of extrusion head 42, being appropriately shaped to loosely fit the mold die, acts as a constraint on the newly extruded plastic 70 so that sufficient pressure may be generated therein, by means of liquid 92, to expand it tightly against the walls of cavity 28. It will be evident that the introduction of liquid 92 must be so regulated that only the length of parison 70 in cavity 28 of mold 20B is expanded. Preferably, the introduction of liquid 92 is terminated when the expanded portion of tube 70 is a short distance from the top of sectional mold 20B. Liquid 92 may, if desired, be introduced by means of a positive displacement pump of capacity commensurate with molds 20, and appropriately phased in the operating cycle. This feature would insure a package of guaranteed capacity, thereby obviating any requirement for complicated automatic inspection equipment to meet obligations.

As hereinbefore pointed out, the apparatus includes the floating mounting of mold halves 22 on mold carrier 16 so that sectional molds 20 can be guided in a motion of pure translation, for the entire time any portion of extruding device 42 is received in cavities 28 thereof, by means of rollers 40 engaging grooves 46.

Figure 7:
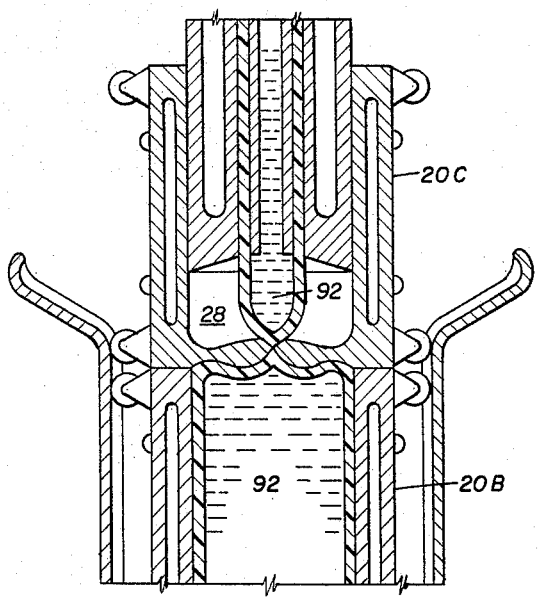

While plastic tube 70 is received in cavity 28 of mold 20B and expanded, the next sectional mold 20C is positioned around extruding device 42. This forming and filling operation must be completed before lateral edges 72 of sectional mold 20C have passed the lower end of extruding device 42. After lateral edges 72 of sectional mold 20C have passed the lower end of extruding device 42, the downward movement of lowermost rollers 40 of mold 20C between lips 90 causes sectional mold 20C to close, as illustrated in the FIGURE 6. The closing of mold 20C effects the severing of the formed and filled container in sectional mold 20B and tube 70 in mold 20C, while sealing the top of the container and the bottom of the tube. The introduction of liquid 92 into the plastic tube 70 in mold 20C through opening 86 is then initiated, as illustrated in FIGURE 7, and the above described cycle is repeated.

As sectional mold 20B, containing the filled and sealed container moves between lips 34 of guide 36, the cooling and setting of the container is hastened by cooling medium circulating through cooling chambers 48. Consequently, the container has been cooled sufficiently to have enough rigidity to support itself and maintain its shape by the time sectional mold 20B reaches the end of its circular path. At this point, guide 36 is terminated to cause sectional mold 20B to open and eject the filled container, as onto conveyor belt 94, and carried on to the requisite printing and boxing operations.

Although this invention has been described in relation to specific embodiments, it is contemplated that various modifications may be made without departing from the intended scope of this invention. For example, various modifications may be made in the extruding device. Although the extruding device has been described as having cylindrical-shaped tubes, tubes of any shape may be used. It is preferred to have the extrusion nozzle provided with removable blocks (represented by the numeral 88 in FIGURE 4) in order that the same extrusion nozzle can be used for forming containers of different cross-sections by utilizing blocks of appropriate shapes. However, it will be evident that the blocks can be made a permanent part of the extrusion nozzle. If desired, the plastic conduit in the extruding device may substantially conform to the shape of the finished containers rather than being merely circular in cross-section. The heating arrangement of the extruder can be modified, as by providing an electric strip heater around the plastic conduit.

It is anticipated that this invention will be particularly useful in the packaging of liquids, especially in the packaging of lubricating oil by the petroleum industry. Other fluids and fluid-like materials that may be packaged in accordance with this invention include greases, gases, slurries, and certain powders.

It will be evident that the heating of a completely filled liquid container, as by storage in an excessively hot location, will result in the container bursting when the expansion of its contents, due to the coefficient of cubical expansion thereof, is such that the elasticity of the container walls is exceeded. A method of reducing the tendency of the container to burst due to the expansion of its contents is by forming a container having a rectangular, rather than a circular, cross-section, as illustrated by the shape of the mold cavity in FIGURE 2. Another method of reducing this tendency is to utilize a heated fluid for expanding the tubular plastic material, although the walls of a completely filled container will bow slightly inwardly upon cooling. A space, can be provided to allow for expansion of the container's contents by terminating the introduction of the liquid into the container before plastic is received in the entire length of the cavity to form an empty neck on the container. It will be evident that any combination of the above-enumerated methods may be utilized.

While this invention has been described for use with thermoplastic material, it is understood that it may be used for making containers from thermosetting materials. However, it will then be necessary to provide heating instead of cooling the material and cooling instead of heating to prevent hardening. Thus materials with which this invention may be used include thermoplastic materials, which are moldable at moderate temperatures, such as polyethylene, polypropylene, styrene polymers, and vinyl polymers; and thermosetting materials, such as urea-formaldehyde resins, diallyl phthalate, and polyester resins. The temperature controls will be modified in accordance with the characteristics of the specific material being used.

The embodiments of the invention in which an exclusive property or privilege is claimed are defined as follows:

1. The method of forming and filling hollow plastic articles which comprises:
   (a) extruding moldable plastic in unconfined, continuous, tubular form from an extruder nozzle while said extruder nozzle and a plurality of pairs of open mold halves, in continguous end-to-end relationship, are moved with respect to each other;
   (b) in succession axially aligning each pair of said open mold halves with said extruder nozzle to receive in the opened cavity of said mold halves at least a portion of said extruder nozzle and tubular plastic material being extruded therefrom;
   (c) in succession closing each pair of said mold halves together whereby at least a portion of said extruder nozzle is enclosed within a major portion of the mold cavity and said tubular plastic material contained within a minor portion of the mold cavity is enclosed by the bottom and side walls of said mold halves and said extruder nozzle; the closing of each of said pair of mold halves effecting
      (1) closing and sealing of the end of tubular material spaced from said extruder nozzle in the mold cavity containing at least a portion of said extruder nozzle and
      (2) closing and sealing of the open end of a previously formed and filled plastic article in the contiguous mold cavity which previously received the tubular plastic material as heretofore described and upon which the following steps (d) and (e) were carried out thereon;
   (d) introducing a fluent material into the interior of the tubular plastic material to expand same into molding contact with said pair of mold halves, while extruding tubular plastic material from said extruder nozzle and moving said extruder nozzle and pair of mold halves with respect to each other at a speed substantially equaling the extrusion speed, such that the relative direction of movement of said pair of mold halves with respect to said extruder nozzle is the same as the direction of extrusion, the fluent material being introduced into the interior of the tubular plastic material at a rate such that the tubular plastic material is expanded at substantially the same rate the distance between the extruder nozzle and bottom wall of the mold cavity is increased by the relative movement of said extruder nozzle and pair of mold halves;
   (e) terminating the introduction of said fluent material before the tubular plastic material is expanded beyond the top of the pair of mold halves;
   (f) cooling the formed and filled plastic article so that same will substantially retain its molded form;
   (g) opening the pair of mold halves containing the filled and formed plastic article and removing same from said pair of mold halves.

2. The method in accordance with claim 1 in which said extruder nozzle is stationary and each pair of said mold halves is moved with respect to said extruder nozzle.

3. The method in accordance with claim 2 in which each pair of said mold halves is guided in a motion of translation for the entire time said pair of mold halves is presented to said extruder nozzle.

4. The method in accordance with claim 3 in which said open pair of mold halves is longitudinally passed by the exterior of said extruder nozzle.

5. The method in accordance with claim 4 in which said pair of mold halves is moved in a circular path.

6. The method in accordance with claim 5 in which the closing of each pair of said mold halves additionally effects severance of the tubular material from the previously formed and filled plastic article in the preceding contiguous mold cavity.

7. An apparatus for forming and filing hollow plastic articles comprising:
   (a) an extruder nozzle adapted to extrude moldable plastic material in confined hollow tubular form;
   (b) a plurality of sectional molds supported in adjacent end-to-end relationship for successive axial alignment with said extruder nozzle and hollow tubular plastic material extruded therefrom, said molds adapted to be opened and closed to define a mold cavity having only side and bottom walls, and said molds also being adapted, upon being closed, to simultaneously:
      (1) close and seal the end of hollow tubular material spaced from said extruder nozzle in the mold cavity containing at least a portion of said extruder nozzle;

(2) close, seal and sever the open end of a previously formed and filled plastic article, in the adjacent mold cavity, from said hollow tubular plastic material;

(c) means for successively opening the sections of each of said sectional molds to receive in the cavities thereof when axially aligned with said extruder nozzle, at least a portion of said extruder nozzle and a segment of hollow tubular plastic material being extruded therefrom, the portion of said extruder nozzle being received in said cavity having an outer surface of substantially uniform cross-section substantially conforming to the shape of the side walls of said cavity and being freely slidable in said cavity;

(d) means for moving said extruder nozzle and each of said sectional molds with respect to each other at a speed equaling the extrusion speed;

(e) means for successively closing each of said sectional molds to enclose at least a portion of said extruder nozzle in a major portion of said cavity and a segment of hollow tubular plastic material in the minor portion of said cavity between said bottom wall and extruder nozzle, such that the received segment of hollow tubular plastic material is entirely enclosed by the side and bottom walls of said cavity and said extruder;

(f) means for moving said extruder nozzle and sectional mold with respect to each other at a speed substantially equaling the extrusion speed, such that the relative direction of movement of said sectional mold with respect to said extruder nozzle is the same as the direction of extrusion and;

(g) means for introducing a fluent material into the interior of the hollow tubular plastic material while said extruder nozzle and mold are moved with respect to each other, at a rate such that the hollow tubular plastic material is expanded at substantially the same rate the distance in the mold cavity between said bottom wall and extruder nozzle is increased by the relative movement of said extruder nozzle and sectional mold;

(h) said means for opening said sectional mold including means to remove the completed articles therefrom.

8. An apparatus in accordance with claim 7 in which said extruder nozzle is stationary and the apparatus includes means for moving said sectional molds at a speed which is substantially the same as the extrusion speed.

9. An apparatus in accordance with claim 8 in which said sectional molds are mounted on the periphery of a circular mold carrier rotated at a speed such that the tangential velocity thereof is substantially the same as the extrusion speed.

10. An apparatus in accordance with claim 9 which includes means to guide said sectional molds in a motion of translation for the entire time said sectional molds are presented to said extruder nozzle.

11. An apparatus in accordance with claim 10 in which each of said sectional molds consists of two complementary mold halves adapted to longitudinally pass by the exterior of said extruder nozzle when open.

References Cited by the Examiner
UNITED STATES PATENTS

| | | | |
|---|---|---|---|
| 2,128,239 | 8/1938 | Ferngren | 264—98 |
| 2,579,390 | 12/1951 | Mills | 264—99 |
| 2,632,202 | 3/1953 | Haines | 264—98 |
| 2,872,760 | 2/1959 | Meissner | 264—88 |

ROBERT F. WHITE, *Primary Examiner.*

ALEXANDER H. BRODMERKEL, *Examiner.*

M. ROSEN, A. R. NOE, *Assistant Examiners.*